United States Patent Office 3,429,114
Patented Feb. 25, 1969

3,429,114
APPARATUS FOR HANDLING WIRE AND
OTHER FILAMENTARY MATERIAL
Frank Lea, Eccleston, near St. Helens, England, assignor to British Insulated Callender's Cables Limited, London, England
Filed Dec. 8, 1965, Ser. No. 512,458
Claims priority, application Great Britain, July 7, 1965, 28,809/65
U.S. Cl. 57—34        6 Claims
Int. Cl. B65h 49/18; D01h 13/00

ABSTRACT OF THE DISCLOSURE

An apparatus for withdrawing wire from a bin in which it is stored in superposed helical turns comprising a high-speed wire haul-off means and means for rotating the bin in a direction and with a speed such that the balloon effect of the wire being withdrawn is eliminated or greatly reduced.

---

Figure 1:
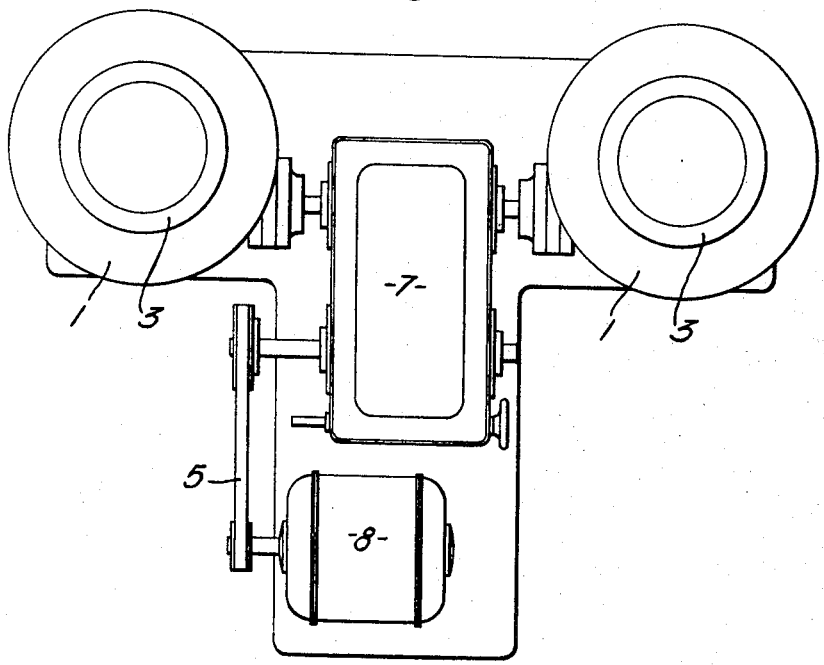

This invention relates to methods of and apparatus for handling wire and other filamentary material, all hereinafter included in the term "wire." More particularly it relates to methods of and apparatus for drawing wire to be treated or processed in some way from a bin in which it is stored in great lengths in superposed helical turns. Such bin may simply comprise a base and an upstanding cylindrical wall, or it may have in addition an inner cylindrical wall upstanding from the central part of the base to provide between it and the outer cylindrical wall an annular space for the storage of wire. Wire is fed into the bin in such a way as to form coils within the bin. At the same time the bin may be rotated slowly about an axis parallel to the bin axis in order to ensure that successive turns are staggered and so to reduce the risk of interlocking of turns which hinders subsequent withdrawal of the wire.

Generally wire can be drawn off at slow speeds from such bins without difficulty and fed into a machine or apparatus for applying some treatment to the drawn off wire, for example to a wire twinning machine operating at a linear throughput speed of 200 feet/min. However, if wire is drawn off at high speeds, for example speeds of about 500 feet per minute or higher, difficulties arise due to the "ballooning" of the wire brought about by the centrifugal force exerted on the length of wire between the point of pick up from the underlying turns and the point at which it runs on to a guiding device located above the bin. This ballooning results in the wire being whipped against the upper edge of the bin and where the wire is an insulated conductor frequently results in the production of insulation faults. Ballooning may also result in the wire becoming tangled as it is withdrawn from the bin and such tangling may cause the wire to break. Where the wire is soft or springy, ballooning may also result in the formation of a kink in the wire as it is pulled into the machine or apparatus for applying some treatment thereto. It is an object of this invention to overcome or at least reduce the difficulties hitherto encountered in drawing off wire at high speeds from bins.

In accordance with the present invention we achieve this object by driving the bin in rotation about its axis or a parallel axis lying within a central part of the bin as wire is being drawn out of the bin. The direction of this rotation is counter to the direcion of rotation of the ballooning wire and the speed of rotation at least sufficient to reduce the speed of rotation of the ballooned wire, and with it the centrifugal force exerted thereon and the size of the balloon, at least sufficiently to substantially eliminate whipping of the wire against the upper edge of the bin.

Our invention also comprises the combination of a bin containing wire coiled therein, a wire haul-off device for drawing wire from the bin at a speed which if the bin were stationary would be sufficiently high to cause the wire to balloon as it leaves the bin and means for rotating the bin at such a speed and in such a direction that during wire withdrawal the size of the balloon is reduced at least to such an extent that whipping of the wire against the upper edge of the outer wall of the bin is substantially eliminated.

When the bin contains helically superposed turns of wire which, when fed into the bin, were laid in a clockwise direction, then the direction of rotation of the balloon as the wire is drawn from the bin will be anticlockwise and hence the direction of rotation in which the bin will be driven will be clockwise. Conversely, where the bin contains turns that were laid in an anticlockwise direction, then the direction of rotation of the balloon as the wire is drawn from the bin will be clockwise and in this case the direction of rotation in which the bin is driven will be anticlockwise. In other words when withdrawing wire from a bin the bin is driven in the same rotational direction as that in which the wire was originally coiled in the bin.

The speed of rotation of the bin should not exceed the speed of rotation of the balloon. It may be chosen to suit the speed of throughput of the machine to which the wire is fed, or it may be chosen to eliminate whipping when wire is being fed to a machine operating at maximum throughput, for if whipping is eliminated at high throughput speeds it will be eliminated at throughput speeds that are lower, but not so low as to cause rotation of the balloon in the reverse direction at a speed high enough to cause whipping.

Rotation of the bin is preferably effected by placing it on a power driven turn-table which is driven by a variable speed motor, electric or fluid operated, through variable speed gear and reduction gear, or even through a fixed gear by a drive taken from the machine to which the wire is being fed.

Figure 2:
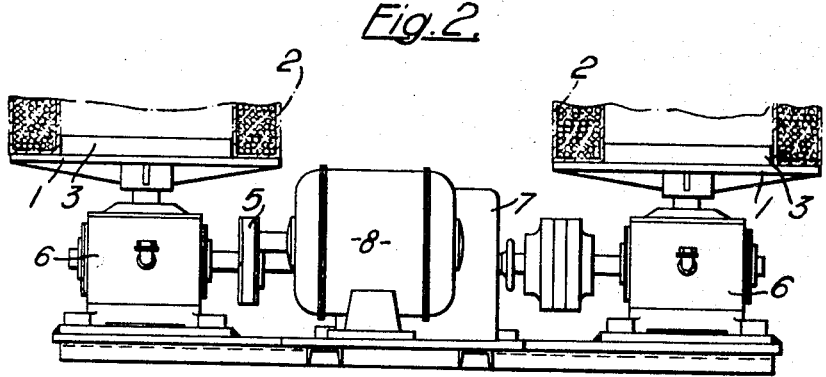
Figure 3:
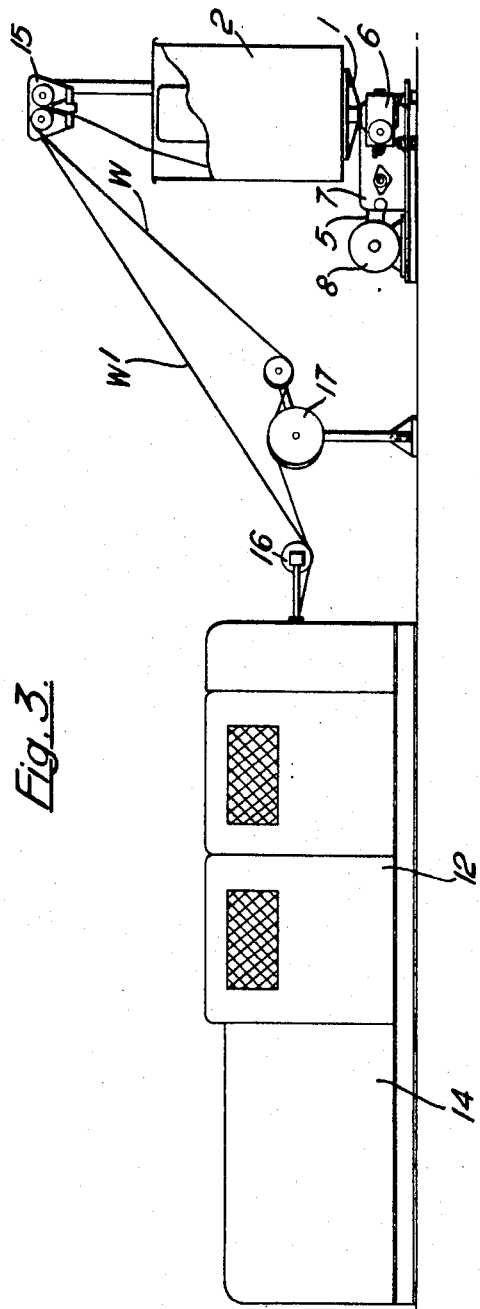
Figure 4:
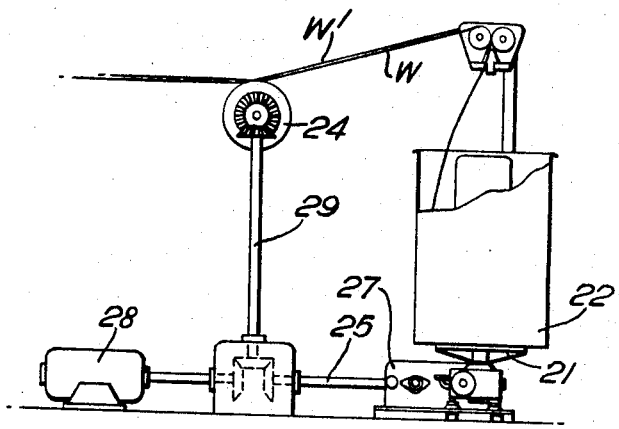

The invention has been found to be especially beneficial in connection with machines for high speed twinning of insulated conductors for use in the manufacture of telecommunication cables and will therefore be further illustrated, by way of example, by a description of apparatus for high speed twinning of insulated conductors shown in the accompanying drawings, in which:

FIGURES 1 and 2, respectively, are plan and elevational views of a pair of power-driven turn-tables;

FIGURE 3 is a side view of the preferred form of high speed twinning apparatus; and FIGURE 4 is a fragmental diagrammatic view of an alternative form of high speed twinning apparatus.

The pair of turn-tables 1 shown in FIGURES 1 and 2 are each adapted to support a bin 2 comprising a circular base, an upstanding peripheral wall and an inner circumferential wall upstanding from the central part of the base and providing between it and the peripheral wall an annular space which contains a great length of insulated wire coiled therein in superposed helical turns. The upper surface of each turn-table 1 is provided with an upstanding central circular projection 3 whose axis is coincident with that of the turn-table and this projection engages in the central circular recess bounded by the inner circumferential wall of the bin, thereby ensuring that the bin is centrally placed on its turn-table. The turn-tables 1 are adapted to be driven via a belt drive 5 through reduction gearing 6 and infinitely variable speed gearing 7 by a single electric motor 8, but in some cases it is possible to dispense with the infinitely variable speed gearing.

As will be seen in FIGURE 3, when the pair of turn-tables 1 are used in combination with a machine 12 for high speed twinning of insulated wires, each of the turn-tables 1, of which only one is visible, supports a bin 2 having an annular space containing wire coiled therein in superposed helical turns. The wires W and W' are drawn from the bins 2 and through the wire-twinning machine 12 by a take-up device 14, each wire in its passage from a bin to the wire-twinning machine passing through a wire tensioning device 15 and over a guide pulley 16. Wire W also passes through a device 17 for measuring the length of wire being fed into the wire-twinning machine 12. The throughput speed at which each wire is drawn from its bin 2 if the bin were stationary would be sufficiently high to cause the wire to balloon as it is withdrawn from the bin. In order to reduce the size of the balloon of each wire sufficiently substantially to eliminate whipping of the wire against the upper edge of its bin, each turn-table 1 is driven in rotation by the motor 8 in a direction counter to the direction of rotation of the ballooning wire being drawn from the bin supported thereon and at a speed sufficient to reduce the speed of rotation of the ballooning wire, and with it the centrifugal force on the ballooning wire, to an extent substantially to eliminate said whipping of the wire. Alternatively, as shown in FIGURE 4 a single electric motor 28 may be employed to drive a pair of turn-tables 21 (of which only one is visible) which support bins 22 and a haul-off capstan 24 which draws wires W and W' from the pair of bins and feeds them to the twinning machine (not shown). The motor 28 may drive each turn-table through a shaft 25 and infinitely variable speed gearing 27 and may drive the capstan 24 through a shaft 29.

By way of example by applying our invention to the twinning of telephone cable conductors we are able to operate the wire-twinning machine at a throughput speed of 1,000 feet per minute by drawing off soft copper wire of 0.020 inch diameter insulated by 8 mils of polyethylene to an overall diameter of 0.036 inch from a pair of bins, each approximately 34 inches in height with an annular space for wire of 24 inches external diameter and 10 inches internal diameter and each supported on a turntable, whilst driving each turn-table in rotation about its axis in a direction counter to the direction of the balooning wire and at a speed of 54 r.p.m. without any whipping of wire against the upper edges of the bins taking place.

I claim:
1. Apparatus comprising, in combination, a bin containing wire coiled therein in superposed helical turns, a wire haul-off device for drawing wire from the bin at a speed which if the bin were stationary would be sufficiently high to cause the wire to balloon as it leaves the bin, and means for rotating the bin in such a direction and at such a speed that during withdrawal of the wire from the bin the size of the balloon is reduced at least to such an extent that whipping of the wire against the upper edge of the outer wall of the bin is substantially eliminated.

2. Apparatus comprising, in combination, a bin containing wire coiled therein in superposed helical turns, a turn-table supporting said bin, a wire haul-off device for drawing wire from the bin at a speed which if the bin were stationary would be sufficiently high to cause the wire to balloon as it leaves the bin, and means for rotating the turn-table in such a direction and at such a speed that during withdrawal of the wire from the bin the size of the balloon is reduced at least to such an extent that whipping of the wire against the upper edge of the outer wall of the bin is substantially eliminated.

3. Apparatus as claimed in claim 2, wherein the means for rotating the turn-table comprises variable speed gear and a variable speed motor for driving the turn-table through said variable speed gear.

4. Apparatus as claimed in claim 3, wherein the variable speed motor also drives the wire haul-off device.

5. Apparatus as claimed in claim 2, wherein the turn-table and the bin supported thereby have interengaging means for positively and centrally locating the bin on the turn-table.

6. Apparatus for high-speed twinning of insulated conductors comprising, in combination, a pair of bins each containing insulated wire coiled therein in superposed helical turns, a pair of turn-tables each supporting one of said pair of bins, a wire-twinning machine and a device associated therewith for drawing insulated wire from both bins and through said wire-twinning machine at a speed which if the bins were stationary would be sufficiently high to cause the insulated wire being drawn from each bin to balloon as it leaves the bin, and a motor for driving both turn-tables in rotation in such a direction and at such a speed that during withdrawal of the wire from the bins the size of the balloon of each wire is reduced at least to such an extent that whipping of the wire against the upper edge of the outer wall of its respective bin is substantially eliminated.

References Cited

UNITED STATES PATENTS

| | | | |
|---|---|---|---|
| 2,944,380 | 7/1960 | Klapper et al. | 57—34 |
| 2,990,672 | 7/1961 | Demmel | 57—34 |
| 3,096,610 | 7/1963 | Bunch | 57—34 |
| 3,299,479 | 1/1967 | Nivens | 19—159 |

FOREIGN PATENTS

| | | |
|---|---|---|
| 634,226 | 1/1962 | Canada. |
| 908,781 | 10/1962 | Great Britain. |

STANLEY N. GILREATH, *Primary Examiner.*

W. H. SCHROEDER, *Assistant Examiner.*

U.S. Cl. X.R.

242—128